(12) United States Patent
Kuczynski et al.

(10) Patent No.: US 10,072,167 B2
(45) Date of Patent: *Sep. 11, 2018

(54) INK COMPOSITIONS

(71) Applicant: International Business Machines Corporation, Armonk, NY (US)

(72) Inventors: Joseph Kuczynski, North Port, FL (US); Marvin M. Misgen, Rochester, MN (US); Debra A. Neuman-Horn, Rochester, MN (US); Joseph F. Prisco, Rochester, MN (US); Kevin J. Przybylski, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,803

(22) Filed: Dec. 7, 2017

(65) Prior Publication Data

US 2018/0100077 A1   Apr. 12, 2018

Related U.S. Application Data

(63) Continuation of application No. 15/154,138, filed on May 13, 2016, now Pat. No. 9,884,974.

(51) Int. Cl.
*B41M 5/28* (2006.01)
*C09D 11/17* (2014.01)
(Continued)

(52) U.S. Cl.
CPC ............. *C09D 11/17* (2013.01); *B41M 5/287* (2013.01); *B43K 29/05* (2013.01); *C09D 11/54* (2013.01);
(Continued)

(58) Field of Classification Search
CPC .. B41M 5/238; B41M 5/287; B41M 2205/18; B41M 2205/24; B41M 5/28; C09D 5/29; C09D 7/007; C09D 11/50; C09D 11/54
(Continued)

(56) References Cited

U.S. PATENT DOCUMENTS 7,381,757 B2   6/2008   Sato et al.
8,182,596 B2   5/2012   Kurihara et al.
(Continued)

FOREIGN PATENT DOCUMENTS

CN   1258703 A   7/2000
EP   1706463 A1   10/2006
(Continued)

OTHER PUBLICATIONS

Irreversible Thermochromic Pigment, Smarol Technology, 2014, http://www.smarol.com/Irreversible-Thermochromic-Pigment.html, 1 pp.
(Continued)

*Primary Examiner* — Bruce H Hess
(74) *Attorney, Agent, or Firm* — Patterson + Sheridan, LLP

(57) ABSTRACT

An ink composition includes a fluid and a plurality of microcapsules suspended in the fluid. The fluid includes a first chemical compound that exhibits a first color characteristic in a first pH range and exhibits a second color characteristic in a second pH range, where the first color characteristic is visually distinct from the second color characteristic. A second chemical compound is contained within the microcapsules, such that rupturing at least a subset of the plurality of microcapsules releases the second chemical compound. Releasing the second chemical compound shifts a pH of the fluid from a first pH in the first pH range to a second pH in the second pH range.

20 Claims, 2 Drawing Sheets

(51) Int. Cl.
*C09D 11/54* (2014.01)
*B43K 29/05* (2006.01)
(52) U.S. Cl.
CPC ..... *B41M 2205/04* (2013.01); *B41M 2205/18* (2013.01); *B41M 2205/24* (2013.01)
(58) Field of Classification Search
USPC ......... 503/201, 215; 428/31.23, 31.32, 31.64
See application file for complete search history.

(56) References Cited

U.S. PATENT DOCUMENTS 8,545,738 B2  10/2013  Kazmaier et al.
9,017,466 B2   4/2015  Adamic et al.

FOREIGN PATENT DOCUMENTS

| | | |
|---|---|---|
| FR | 2487372 A1 | 1/1982 |
| JP | 54083523 | 12/1977 |
| JP | 57135878 A1 | 1/1982 |
| JP | 2006063238 A | 3/2006 |
| JP | 2010222461 A | 10/2010 |
| JP | 2015004022 A | 1/2015 |
| JP | 2015036391 A | 2/2015 |
| JP | 2015083383 A | 4/2015 |
| WO | 2013101588 A1 | 7/2013 |

OTHER PUBLICATIONS

Pilot FriXion Ball Erasable Gel Pens, Cool Tools, Jul. 15, 2013, http://www.jetpens.com/Pilot-FriXion-Light-Erasable-Highlighter-6-Color-Set/pd/3529, 1 pp.
The Chemistry of Highlighter Colors, Compound Interest, Jan. 22, 2015, http://www.compoundchem.;com/2015/01/22/highlighters/, 6 pp.
U.S. Appl. No. 15/154,138, entitled "Ink Compositions,", as filed on May 13, 2016.
List of IBM Patents or Applications Treated as Related.

INK COMPOSITIONS

CROSS-REFERENCE TO RELATED APPLICATIONS

This application is a continuation of co-pending U.S. patent application Ser. No. 15/154,138, filed May 13, 2016. The aforementioned related patent application is herein incorporated by reference in its entirety.

FIELD OF THE DISCLOSURE

The present disclosure relates generally to ink compositions and systems and methods for making and using the ink compositions.

BACKGROUND

In certain applications, it is desirable to apply markings that are removable. For example, college students may purchase a new set of rather expensive text books each semester. The students are often able to resell the text books at the end of the semester; however, the price paid for a text book during resale may depend on the condition of the text book, including whether the text book has visible markings. Thus, while marking the text book (e.g., highlighting portions of the text) may help the student learn the material, it may also decrease the amount of money the student can expect to receive for the text book at resale.

SUMMARY OF THE DISCLOSURE

According to a particular embodiment, an ink composition includes a fluid and a plurality of microcapsules suspended in the fluid. The fluid includes a first chemical compound that exhibits a first color characteristic in a first pH range and exhibits a second color characteristic in a second pH range, where the first color characteristic is visually distinct from the second color characteristic. A second chemical compound is contained within the microcapsules, such that rupturing at least a subset of the plurality of microcapsules releases the second chemical compound. Releasing the second chemical compound shifts the pH of the fluid from a first pH in the first pH range to a second pH in the second pH range.

According to another particular embodiment, a marking implement includes a tip, a fluid reservoir coupled to the tip, and an ink composition within the fluid reservoir. The ink composition includes a fluid and a plurality of microcapsules suspended in the fluid. The fluid includes a first chemical compound that exhibits a first color characteristic in a first pH range and exhibits a second color characteristic in a second pH range, where the first color characteristic is visually distinct from the second color characteristic. A second chemical compound is contained within the microcapsules, such that rupturing at least a subset of the plurality of microcapsules releases the second chemical compound. Releasing the second chemical compound shifts a pH of the fluid from a first pH in the first pH range to a second pH in the second pH range.

According to another particular embodiment, a method of changing a color characteristic of an ink composition is disclosed. The method may be performed after an ink composition has been applied to a surface, where the ink composition includes a fluid and a plurality of microcapsules suspended in the fluid. The fluid includes a first chemical compound that exhibits a first color characteristic in a first pH range and exhibits a second color characteristic in a second pH range. The first color characteristic is visually distinct from the second color characteristic. A second chemical compound is contained within the microcapsules. The method includes rupturing at least a subset of microcapsules of the plurality of microcapsules to release the second chemical compound. The second chemical compound, when released, shifts a pH of the fluid from a first pH in the first pH range to a second pH in the second pH range.

Features and other benefits that characterize embodiments are set forth in the claims annexed hereto and form a further part hereof. However, for a better understanding of the embodiments, and of the advantages and objectives attained through their use, reference should be made to the Drawings and to the accompanying descriptive matter.

DETAILED DESCRIPTION

Figure 1:
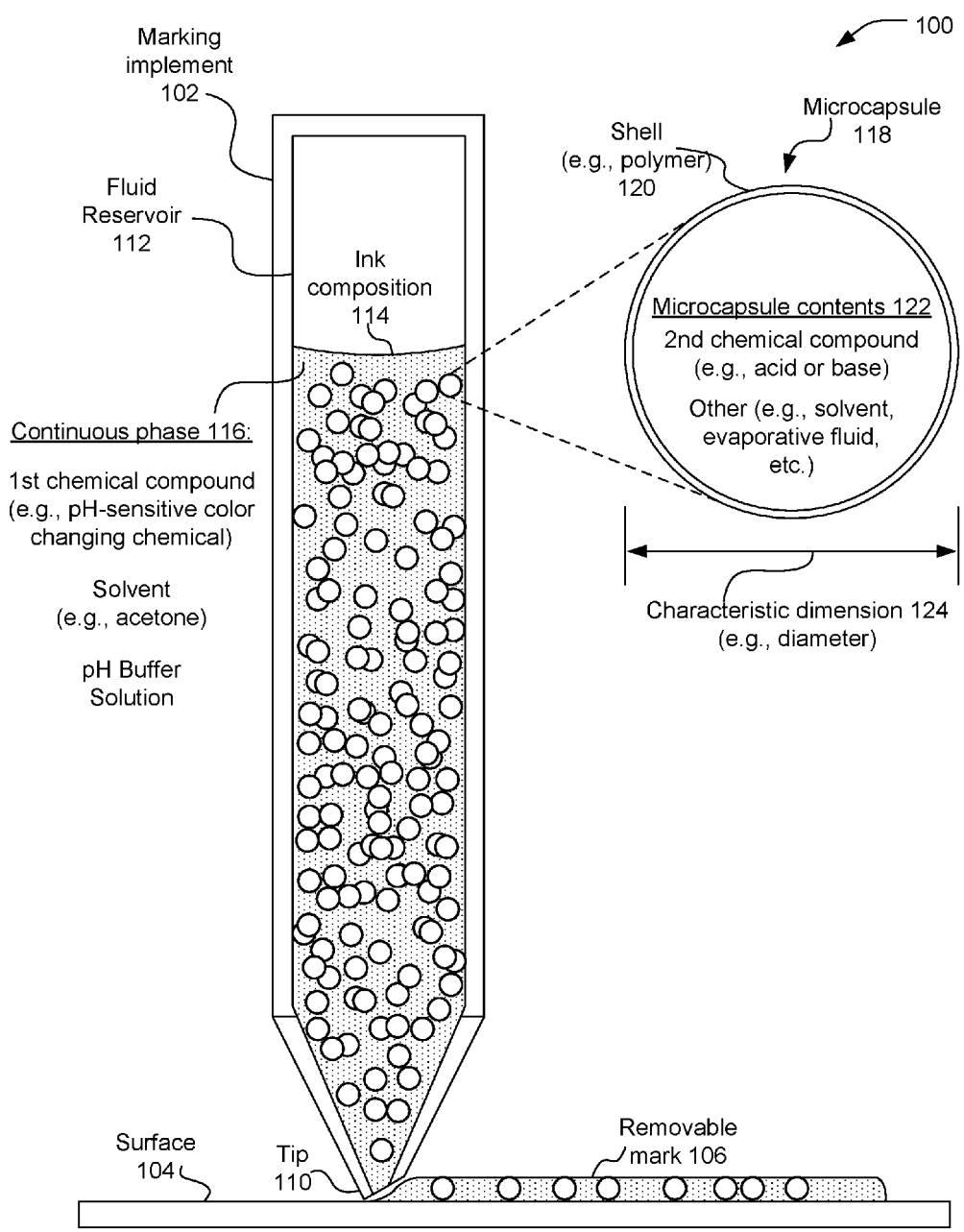
FIG. 1 is an illustration of a system including a writing implement having pH-based color changing ink according to one embodiment.

Ink compositions and systems and methods of using the ink compositions are disclosed. The ink compositions are formulated to undergo a color change (e.g., from a first color to a second color, from colored to colorless, or from colorless to colored) based on pH. The ink compositions include pH adjusting components in microcapsules, such that if the microcapsules (or a sufficient number of the microcapsules) are ruptured, the ink compositions undergo the color change. Thus, the ink compositions are color changing or removable (e.g., can be made colorless). Similar to inks that undergo a thermal color change, increased temperature (e.g., heating) may be used to trigger the color change in the disclosed ink compositions. However, unlike thermal color changing inks, the disclosed ink compositions undergo a more durable color change. For example, after the microcapsules of the disclosed ink compositions are ruptured, a pH change caused by rupturing the microcapsules causes the color change. Therefore, the color change is not reversed when the heating is removed (e.g., when the temperature decreases).

The system 100 includes a marking implement 102 and a surface 104 to be marked. The marking implement 102 may be configured to make a removable mark 106 on the surface 104. For example, the marking implement 102 may include or correspond to a pen, a marker, or a highlighter, and the surface 104 may be a surface of a sheet of paper, a page of a book, or any other markable surface. To illustrate, in a particular implementation, the surface 104 corresponds to a page of a book, and the marking implement 102 is a highlighter. In this implementation, the removable mark 106 may be a non-opaque (e.g., transparent, semi-transparent, or translucent) mark having a color that contrasts with the surface 104.

The marking implement 102 includes a fluid reservoir 112 coupled to a tip 110. The fluid reservoir 112 stores an ink composition 114 and is in fluid communication with the tip 110 to enable the tip 110 to make the removable mark 106 using the ink composition 114. The tip 110 may include or correspond to a ballpoint (or roller ball) tip, a nib, a fiber tip (e.g., felt tip), or another tip capable of making the removable mark 106 using the ink composition 114.

The ink composition is a colloid or suspension including a fluid (e.g., a liquid or gel) forming a continuous phase and microcapsules (such as representative microcapsule 118) dispersed or suspended within the fluid. The fluid includes a first chemical compound that exhibits a color change based on pH. For example, the first chemical compound may exhibit a first color characteristic in a first pH range and may exhibit a second color characteristic in a second pH range. The first color characteristic is visually distinct from the second color characteristic. To illustrate, when the first chemical compound exhibits the first color characteristic, the first chemical compound (and therefore the ink composition 114) may exhibit a first color. In this illustration, when the first chemical compound exhibits the second color characteristic, the first chemical compound (and therefore the ink composition 114) may have a second color that is different from the first color. In another illustrative example, when the first chemical compound exhibits the first color characteristic, the first chemical compound (and therefore the ink composition 114) may be colored (e.g., have a color). In this illustration, when the first chemical compound exhibits the second color characteristic, the first chemical compound (and therefore the ink composition 114) may be substantially colorless.

As described above, the first chemical compound exhibits a color change based on pH. For example, the first chemical compound may include phenolphthalein, cresolphthalein, thymolphthalein, another pH-based color changing chemical, or a combination thereof. As a first example, the first chemical compound may include or correspond to (e.g., consist of) phenolphthalein. Phenolphthalein is colored (e.g., orange) at very low pH values (e.g., pH values less than 0), is colorless at low pH values (e.g., pH values within a range from about 0 to about 8.2), is colored (e.g., fuchsia) at high pH values (e.g., pH values within a range from about 8.2 to about 12), and is colorless at very high pH values (e.g., pH values greater than about 13). Thus, phenolphthalein exhibits at least three visually distinct color characteristics (orange, fuchsia, and colorless) depending on pH.

As a second example, the first chemical compound may include or correspond to (e.g., consist of) cresolphthalein. Cresolphthalein is colorless at low pH values (e.g., pH values less than about 8.2) and is colored (e.g., purple) at higher pH values (e.g., pH values greater than about 9.8). Thus, cresolphthalein exhibits at least two visually distinct color characteristics (purple and colorless) depending on pH.

As a third example, the first chemical compound may include or correspond to (e.g., consist of) thymolphthalein. Thymolphthalein is colorless at low pH values (e.g., pH values less than about 9.3) and is colored (e.g., blue) at higher pH values (e.g., pH values greater than about 10.5). Thus, thymolphthalein exhibits at least two visually distinct color characteristics (blue and colorless) depending on pH.

The first chemical compound may be present in the fluid at a concentration sufficient to impart a desired color intensity to the ink composition. The fluid may also include a pH buffer compound. The pH buffer compound may be selected based on the first chemical compound. For example, the identity of and the concentration of the pH buffer compound may be selected to maintain the pH of the fluid within a range of pH values in which the first chemical compound is colored. To illustrate, if the first chemical compound includes phenolphthalein, the pH buffer compound may include a base (and a conjugate salt of the base) in sufficient concentration to maintain the pH of the fluid within the range of pH values from about 8.2 to about 12, such that the phenolphthalein exhibits a fuchsia color. As another illustration, if the first chemical compound includes cresolphthalein, the pH buffer compound may include a base (and a conjugate salt of the base) in sufficient concentration to maintain the pH of the fluid at a pH value greater than about 9.8, such that the cresolphthalein exhibits a purple color. As yet another illustration, if the first chemical compound includes thymolphthalein, the pH buffer compound may include a base (and a conjugate salt of the base) in sufficient concentration to maintain the pH of the fluid at a pH value greater than about 10.5, such that the thymolphthalein exhibits a blue color.

The fluid may also include a solvent that is compatible with (e.g., capable of holding in solution) the first chemical compound and is compatible with (e.g., does not dissolve or chemically react with) the microcapsules. The solvent may also be selected to vaporize (e.g., evaporate) at room temperature and pressure (e.g., at a temperature of about 20° C. and an absolute pressure of about 101.325 kPa). For example, the solvent may have a vapor pressure greater than about 0.1 mm Hg (0.013 kPa) at 25° C. To illustrate, the solvent may include acetone. In some implementations, the fluid may also include other components, such as pigments, dyes, stabilizers, surfactants, etc.

The microcapsules suspended in the fluid are represented in FIG. 1 with exaggerated dimensions relative to the marking implement 102. The microcapsules are small enough to pass through the tip 110 and to not be visually distracting (e.g., to be undetectable or barely detectable to the unaided human eye). As used herein, the term "microcapsule" refers to capsules that have a characteristic dimension 124 (e.g., a diameter) smaller than about 10 µm. Due to manufacturing variability, the microcapsules may have non-uniform dimensions. Accordingly, in some implementations, the size of the microcapsules may be described in terms of bulk or average values. In such implementations, the microcapsules may have a mean characteristic dimension 124 that is less than 10 µm. In some embodiments, the characteristic dimension 124 (or the average characteristic dimension 124) of the microcapsules may be significantly smaller, in which case the microcapsules may also be referred to as "nanocapsules".

As illustrated by the representative microcapsule 118, each of the microcapsules includes a polymer shell 120 encapsulating microcapsule contents 122. The microcapsule contents 122 include a second chemical compound. In some implementations, the microcapsule contents 122 may also include other chemicals such as a solvent, an evaporative fluid, stabilizers, surfactants, etc. The microcapsules are configured to rupture when exposed to particular conditions, such as heat or abrasion. When a microcapsules ruptures, the microcapsule contents 122 are able to intermingle with other components of the ink composition.

The second chemical compound may be selected to shift the pH of the ink composition 114. In particular, if a sufficient number of the microcapsules (e.g., at least a subset of the microcapsules in the removable mark 106) are ruptured, the second chemical compound may cause the pH to shift enough to cause a change in a color characteristic of the first chemical compound (and thus of the removable mark 106). For example, if the first chemical compound includes phenolphthalein, the ink composition 114 may have a pH value between about 8.2 and about 12 and may exhibit a fuchsia color. In this example, the second chemical compound may be more acidic (e.g., low pH) than the ink composition 114 such that if a sufficient number of the microcapsules containing the second chemical compound are ruptured, the pH of the ink composition 114 is reduced to a pH value between about 0 and about 8.2. In this example, reducing the pH value to between about 0 and about 8.2 causes the phenolphthalein to become colorless.

In another example, if the first chemical compound includes phenolphthalein, the ink composition 114 may have a pH value less than about 0 and may exhibit an orange color. In this example, the second chemical compound may be more basic (e.g., higher pH) than the ink composition 114 such that if a sufficient number of the microcapsules containing the second chemical compound are ruptured, the pH of the ink composition 114 is increased to a pH value between about 0 and about 8.2. In this example, increasing the pH value to between about 0 and about 8.2 causes the phenolphthalein to become colorless.

In yet another example, if the first chemical compound includes phenolphthalein, the ink composition 114 may have a pH value between about 8.2 and about 12 and may exhibit a fuchsia color. In this example, the second chemical compound may be more basic (e.g., higher pH) than the ink composition 114 such that if a sufficient number of the microcapsules containing the second chemical compound are ruptured, the pH of the ink composition 114 is increased to a pH value greater than about 13.0. In this example, increasing the pH value to greater than about 13.0 causes the phenolphthalein to become colorless.

In another example, if the first chemical compound includes cresolphthalein, the ink composition 114 may have a pH value greater than 9.8 and may exhibit a purple color. In this example, the second chemical compound may be more acidic (e.g., lower pH) than the ink composition 114 such that if a sufficient number of the microcapsules containing the second chemical compound are ruptured, the pH of the ink composition 114 is decreased to a pH value less than about 8.2. In this example, decreasing the pH value to less than about 8.2 causes the cresolphthalein to become colorless.

In yet another example, if the first chemical compound includes thymolphthalein, the ink composition 114 may have a pH value greater than about 10.5 and may exhibit a blue color. In this example, the second chemical compound may be more acidic (e.g., lower pH) than the ink composition 114 such that if a sufficient number of the microcapsules containing the second chemical compound are ruptured, the pH of the ink composition 114 is decreased to a pH value less than about 9.3. In this example, decreasing the pH value to less than about 9.3 causes the thymolphthalein to become colorless.

Each of the above examples may result in a color change of the ink composition 114 (or at least a portion of the ink composition proximate that ruptured microcapsules). To illustrate, if the first chemical compound is the only or is the primary coloring agent in the ink composition 114, the color change of the first chemical compound may cause the ink composition 114 to change from colored (e.g., fuchsia, orange, purple, or blue) to substantially colorless. Thus, in this example, the removable mark 106 can be "removed" (e.g., made colorless) by rupturing a sufficient number of microcapsules in the removable mark 106.

Although the examples above describe the first chemical compound as a single chemical, in other examples, multiple chemicals may form the first chemical compound. To illustrate, a mixture including two or more of phenolphthalein, cresolphthalein, thymolphthalein, or other pH-based color change agents may be used to give the ink composition 114 desired color characteristics. For example, two or more pH-based color change agents may be combined to cause the ink composition 114 to exhibit a first color when the microcapsules are intact (e.g., not ruptured) and to exhibit a second color when a sufficient number of the microcapsules are ruptured. As another example, two or more pH-based color change agents may be combined to cause the ink composition 114 to exhibit a first color when the microcapsules are intact (e.g., not ruptured) and to cause the ink composition to be substantially colorless when a sufficient number of the microcapsules are ruptured. In other examples, more than two color changes may be accomplished. To illustrate, a first color change (or colored/colorless change) may result if some of the microcapsules are ruptured, and a second color change (or colored/colorless change) may result if even more of the microcapsules are ruptured.

In a particular embodiment, the microcapsule contents 122 may include an evaporative fluid that is chemically compatible with (e.g., non-reactive with) the second chemical compound and that is selected to facilitate rupturing the shell 120 under particular conditions. For example, the evaporative fluid may have a relatively low boiling point such that subjecting the surface 104 to heat results in evaporation or boiling of the evaporative fluid, which increases internal pressure within the shell 120 resulting in the shell 120 rupturing. Thus, in this example, the boiling point of the evaporative fluid establishes a threshold temperature such that heating the surface 104 to or above the threshold temperature causes the microcapsules in the removable mark 106 to rupture, and results in a color change (or colored/colorless change) of the ink composition 114 of the removable mark 106.

The evaporative fluid may be selected to have a boiling point that is high enough for the marking implement 102 to be stored and used at expected temperatures without rupturing the microcapsules, and low enough that the microcapsules can be ruptured by application of energy (e.g. heat or microwaves) without damaging the surface 104. To illustrate, if the marking implement 102 is primarily intended to be used to write on paper (i.e., the surface 104 is paper), the boiling point of the evaporative fluid may be less than the autoignition temperature of paper in a normal atmosphere (e.g., about 21% oxygen), which has reported values from around 218° C. to about 246° C. Since paper compositions vary significantly, a safety margin may be used. For example, the boiling point of the evaporative fluid may be selected to be less than about 200° C. to ensure that the autoignition temperature of most paper composition will not be exceeded. To allow for storage and use of the marking implement 102 without risk of rupturing the microcapsules, the boiling point of the evaporative fluid should be greater than room temperature (e.g., about 20° C.). However, again, a safety margin may be used since storage and use conditions may vary significantly. Thus, in some implementations, the lower bound to the boiling point of a suitable evaporative fluid may be set in a range from about 40° C. to about 55° C. As a specific example, acetone, which has a boiling point of about 56° C. may be used as the evaporative fluid in some embodiments. However, in other embodiments, other chemicals that are chemically compatible with (e.g., non-reactive with) the second chemical compound and have a boiling point between about 40° C. and about 200° C. may be used for marking implements to be used primarily for marking paper.

In a particular embodiment, the microcapsules may be formed using an emulsion technique. For example, the microcapsule contents and components of the polymer shell (e.g., one or more monomers) may be selected to form an "oil" phase (e.g., a hydrophobic phase), which may be mixed into a water phase. A stirring speed of the oil-in-water combination may be selected to form microcapsules of a specific size (or having a desired range of sizes or mean size). For example, a faster stir speed may result in formation (on average) of smaller microcapsules than a slower stir speed. A cross-linking agent may be added to the oil-in-water combination to cause formation of the polymer shell 120 around the microcapsule contents 122, which are in the oil phase. After curing, the microcapsules may be rinsed and filtered or sieved to remove microcapsules that are too large. Finally, the microcapsules may be added to the fluid of the continuous phase 116 of FIG. 1 to form the ink composition 114.

Although the ink composition 114 is illustrated in FIG. 1 in the context of a marking implement 102 (e.g., a highlighter), the ink composition 114 may be used wholly apart from the marking implement 102. For example, the ink composition 114 may be manufactured and sold in bulk (e.g., as bulk ink). As another example, rather than being packaged in a marking implement, the ink composition 114 may be packaged in an ink refill that is to be used with a marking implement. As another example, the ink composition 114 may be packaged for use with an automated printing device, such as in an ink cartridge for a computer printer or plotter. Accordingly, the ink composition 114 is useful in the context of the marking implement 102 or apart from the marking implement 102.

Regardless of how it is packaged, the ink composition 114 provides the capability of making removable or color changing (including colored/colorless changing) marks, such as the removable mark 106. Since marks made using the ink composition 114 change color based on pH, the color change is durable. For example, the color change may be effectively permanent unless the surface 104 is subjected to another pH change, e.g., by exposure to an acid or base. This is in contrast to inks that change color based on thermal properties of the ink, because such inks can revert (e.g., undergo another color change) due to temperature variations. To illustrate, a thermally-color changing ink make undergo a color change (from a first color to a second color) when heated above a threshold temperature, but may revert (e.g., return to the first color) when the temperature drops below the threshold temperature. In contrast, when heat is used to rupture the microcapsules of the ink composition 114, the ink composition 114 undergoes a reaction that is not reversible when the heat is subsequently removed.

Figure 2:
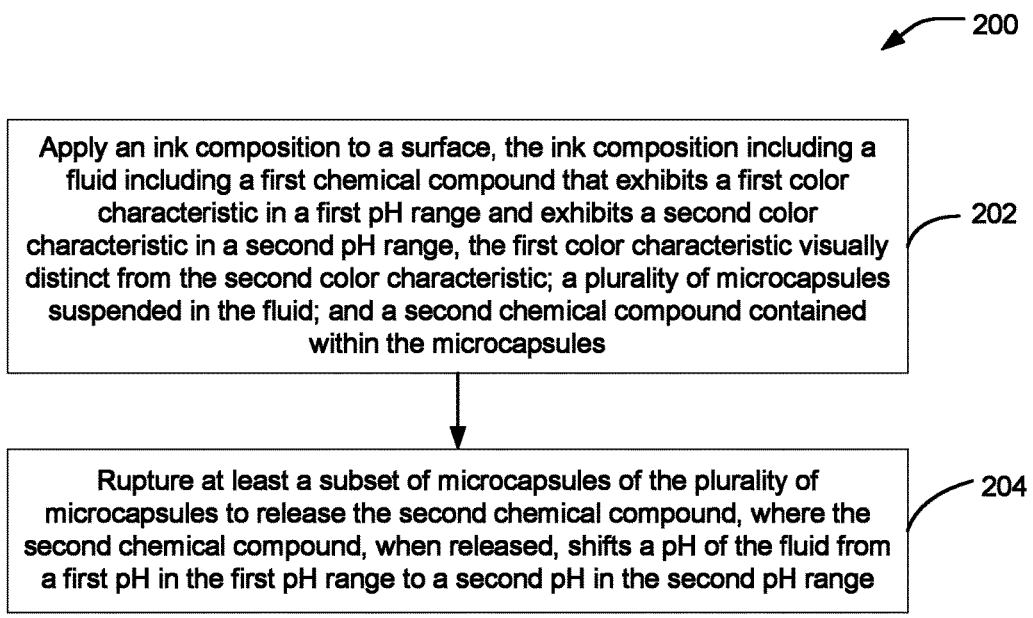
FIG. 2 is a flow diagram showing a particular embodiment of a method of using a pH-based color changing ink.

FIG. 2 is a flow diagram showing a particular embodiment of a method 200 of using a pH-based color changing ink, such as the ink composition 114 of FIG. 1. For example, the ink composition used in the method 200 may include a fluid including a first chemical compound that exhibits a first color characteristic in a first pH range and exhibits a second color characteristic in a second pH range, where the first color characteristic is visually distinct from the second color characteristic. The ink composition may also include a plurality of microcapsules suspended in the fluid, and a second chemical compound contained within the microcapsules. The fluid may also include a solvent and a pH buffer compound selected to cause the fluid to have a first pH while the microcapsules are intact. The second chemical compound, when released, may shift the pH of the fluid from the first pH (in the first pH range) to a second pH (in the second pH range outside the first pH range). Thus, the ink composition may undergo a color change, such as a change from a first color to a second color, a change from colored to colorless, or a change from colorless to colored, as a result of rupturing at least some of the microcapsules.

The method 200 includes, at 202, applying the ink composition to a surface. For example, the ink composition 114 may be applied to the surface 104 using the marking implement 102 to form the removable mark 106. In other examples, the ink composition may be applied using a different method, such as a sprayer or jet. In an illustrative use case, the marking implement 102 is a highlighter and the surface is a page of a book, such as a text book. In this use case, the removable mark 106 may be applied to the page to highlight a portion of text on the page.

The method 200 also includes, at 204, after applying the ink composition to a surface, rupturing at least a subset of microcapsules (of the plurality of microcapsules if the ink composition) to release the second chemical compound. For example, heat may be applied to the surface to cause at least some of the microcapsules to rupture. In another example, the microcapsules may be ruptured by applying energy to the surface using a different technique, such as by abrasion.

To illustrate, continuing the illustrative use case above in which the surface is a page of text book and the ink composition is used to highlight a portion of text in the text book, after using the textbook and highlighting it in one or more locations, the owner of the text book may desire to remove the highlighting (e.g., to facilitate resale of the text book). Thus, the owner of the text book may apply heat to the page (or to the entire text book) to rupture a sufficient number of the microcapsules to cause the ink composition used to highlight the text book to undergo a color change (in this example, from colored to substantially colorless). To illustrate, the text book may be heated in an oven or microwave. As the text book is heated, pressure exerted by the microcapsule contents 122 on the shell 120 increases. For example, if the microcapsule contents 122 include an evaporative fluid, the evaporative fluid (or a portion thereof) may vaporize, resulting in increased pressure within the shell 120. When sufficient heat has been applied (e.g., when the text book reaches a threshold temperature), at least some of the microcapsules will rupture, releasing the second chemical compound to interact with the first chemical compound. Releasing the second chemical compound shifts the pH of the ink composition sufficiently for the first chemical composition to undergo a color change (in this example, from colored to substantially colorless). Thus, the highlighted portion of the text book becomes colorless, enabling resale of the text book at a higher price than may be paid for the text book if the highlights remain colored.

The previous description of the disclosed embodiments is provided to enable a person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:
1. An ink composition comprising:
a fluid including a first chemical compound that exhibits a first color characteristic in a first pH range and exhibits a second color characteristic in a second pH range, the first color characteristic visually distinct from the second color characteristic;

a plurality of microcapsules suspended in the fluid and configured to rupture upon application of energy to the microcapsules; and a second chemical compound contained within the microcapsules, wherein rupturing at least a subset of the plurality of microcapsules to release the second chemical compound shifts a pH of the fluid from a first pH in the first pH range to a second pH in the second pH range.

2. The ink composition of claim 1, wherein the first chemical compound is colored when exhibiting the first color characteristic and is substantially colorless when exhibiting the second color characteristic.

3. The ink composition of claim 1, wherein the first chemical compound includes phenolphthalein.

4. The ink composition of claim 1, wherein the first chemical compound includes cresolphthalein.

5. The ink composition of claim 1, wherein the first chemical compound includes thymolphthalein.

6. The ink composition of claim 1, wherein the fluid includes a solvent and a pH buffer compound selected to cause the fluid to have the first pH while the microcapsules are intact.

7. The ink composition of claim 1, wherein the second chemical compound is an acid.

8. The ink composition of claim 1, wherein the second chemical compound is a base.

9. The ink composition of claim 1, wherein the microcapsules are configured to rupture when abraded.

10. The ink composition of claim 1, wherein each microcapsule includes a polymer shell encapsulating a portion of the second chemical compound.

11. The ink composition of claim 1, wherein the plurality of microcapsules have a mean characteristic dimension of less than 10 μm.

12. A marking implement comprising:
a tip;
a fluid reservoir coupled to the tip; and
an ink composition within the fluid reservoir, the ink composition comprising:
a fluid including a first chemical compound that exhibits a first color characteristic in a first pH range and exhibits a second color characteristic in a second pH range, the first color characteristic visually distinct from the second color characteristic;
a plurality of microcapsules suspended in the fluid and configured to rupture upon application of energy to the microcapsules; and a second chemical compound contained within the microcapsules, wherein rupturing at least a subset of the plurality of microcapsules to release the second chemical compound shifts a pH of the fluid from a first pH in the first pH range to a second pH in the second pH range.

13. The marking implement of claim 12, wherein the first chemical compound is colored when exhibiting the first color characteristic and is substantially colorless when exhibiting the second color characteristic.

14. The marking implement of claim 12, wherein the fluid includes a solvent and a pH buffer compound selected to cause the fluid to have the first pH while the microcapsules are intact.

15. The marking implement of claim 12, wherein the microcapsules are configured to rupture when abraded.

16. The marking implement of claim 12, wherein the plurality of microcapsules have a mean characteristic dimension of less than 10 μm.

17. A method of changing a color characteristic of an ink composition, the method comprising, after an ink composition has been applied to a surface, the ink composition comprising:
a fluid including a first chemical compound that exhibits a first color characteristic in a first pH range and exhibits a second color characteristic in a second pH range, the first color characteristic visually distinct from the second color characteristic; and
a plurality of microcapsules suspended in the fluid; and
a second chemical compound contained within the microcapsules:
by applying energy to the surface, rupturing at least a subset of microcapsules of the plurality of microcapsules to release the second chemical compound, wherein the second chemical compound, when released, shifts the pH of the fluid from a first pH in the first pH range to a second pH in the second pH range.

18. The method of claim 17, wherein rupturing at least the subset of microcapsules comprises abrading the surface.

19. The method of claim 17, wherein shifting the pH of the fluid causes the ink composition to change from a first color to a second color.

20. The method of claim 17, wherein shifting the pH of the fluid causes the ink composition to change from colored to substantially colorless.

* * * * *